(12) United States Patent
Park et al.

(10) Patent No.: US 9,285,524 B2
(45) Date of Patent: Mar. 15, 2016

(54) OPTICAL FILTER

(71) Applicant: LG CHEM, LTD., Seoul (KR)

(72) Inventors: Moon Soo Park, Daejeon (KR); Byoung Kun Jeon, Daejeon (KR); Sang Seop Kim, Chungcheongbuk-do (KR); Kyung Ki Hong, Chungcheongbuk-do (KR); Dong Ho Ko, Chungcheongbuk-do (KR); Doo Young Huh, Chungcheongbuk-do (KR); Su Young Ryu, Daejeon (KR); Seung Ryong Lee, Chungcheongbuk-do (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/172,460

(22) Filed: Feb. 4, 2014

(65) Prior Publication Data

US 2014/0153093 A1    Jun. 5, 2014

Related U.S. Application Data

(63) Continuation of application No. PCT/KR2012/006262, filed on Aug. 7, 2012.

(30) Foreign Application Priority Data

Aug. 9, 2011 (KR) .......... 10-2011-0078990
Aug. 6, 2012 (KR) .......... 10-2012-0085820

(51) Int. Cl.
*G02B 27/26* (2006.01)
*G02B 5/30* (2006.01)

(52) U.S. Cl.
CPC ........... *G02B 5/3083* (2013.01); *G02B 5/3016* (2013.01)

(58) Field of Classification Search
CPC ....... G02B 5/3083; G02B 5/3016; G02B 5/32
See application file for complete search history.

(56) References Cited

U.S. PATENT DOCUMENTS

| | | | |
|---|---|---|---|
| 6,046,787 A | 4/2000 | Nishiguchi | |
| 7,862,880 B2 * | 1/2011 | Katschorek et al. | 428/172 |
| 8,223,280 B2 | 7/2012 | Hoshi | |
| 8,305,503 B1 | 11/2012 | Hoshi | |
| 2010/0265433 A1 * | 10/2010 | Hoshi | 349/62 |
| 2012/0062848 A1 * | 3/2012 | Koyanagi et al. | 353/20 |

FOREIGN PATENT DOCUMENTS

| | | |
|---|---|---|
| CN | 101363981 A | 2/2009 |
| CN | 101896842 A | 11/2010 |
| CN | 101900890 A | 12/2010 |
| JP | 2002-185983 A | 6/2002 |
| JP | 2008-68599 A | 3/2008 |
| JP | 2010-96900 A | 4/2010 |
| JP | 2010-204389 A | 9/2010 |
| JP | 201129161 A | 2/2011 |
| JP | 2011048286 A | 3/2011 |
| JP | 2011158574 A | 8/2011 |
| JP | 2012220776 A | 11/2012 |
| KR | 10-2002-0004296 | 1/2002 |

(Continued)

*Primary Examiner* — Scott J Sugarman
*Assistant Examiner* — Robert E Tallman
(74) *Attorney, Agent, or Firm* — Dentons US LLP

(57) ABSTRACT

Provided are an optical filter and a stereoscopic display device. The exemplary optical filter may be applied to the stereoscopic display device to observe a stereoscopic image in a wide viewing angle without the loss of brightness.

9 Claims, 11 Drawing Sheets

(56) References Cited

FOREIGN PATENT DOCUMENTS

| KR | 10-2006-0105351 | 10/2006 |
| KR | 10-2009-0082065 | 7/2009 |
| KR | 10-2010-0089873 | 8/2010 |
| KR | 10-2010-0089873 A | 8/2010 |
| WO | 2010/067809 A1 | 6/2010 |
| WO | 2010070772 A1 | 6/2010 |

* cited by examiner

| 21 |
|---|
| 22 |
| 21 |
| 22 |
| 21 |

| 21 | 22 | 21 | 22 | 21 |
|----|----|----|----|----|
| 22 | 21 | 22 | 21 | 22 |
| 21 | 22 | 21 | 22 | 21 |
| 22 | 21 | 22 | 21 | 22 |
| 21 | 22 | 21 | 22 | 21 |

| 11 |
|----|
| 12 |
| 11 |
| 12 |
| 11 |

| 11 | 12 | 11 | 12 | 11 |
|----|----|----|----|----|
| 12 | 11 | 12 | 11 | 12 |
| 11 | 12 | 11 | 12 | 11 |
| 12 | 11 | 12 | 11 | 12 |
| 11 | 12 | 11 | 12 | 11 |

OPTICAL FILTER

CROSS-REFERENCE TO RELATED APPLICATION

This application is a Continuation Bypass of International Application PCT/KR2012/006262, with an international filing date of Aug. 7, 2012, which claims priority to and the benefit of Korean Patent Application No. 10-2011-0078990, filed on Aug. 9, 2011, and Korean Patent Application No. 10-2012-0085820, filed on Aug. 6, 2012, all of which are incorporated herein by reference in their entirety.

BACKGROUND

1. Field of the Invention

The present invention relates to an optical filter and a stereoscopic display device.

2. Discussion of Related Art

A stereoscopic display device is a display device capable of displaying three-dimensional images. Since the stereoscopic display device can display a subject in a space as a three-dimensional image, it can deliver three-dimensional information of a material to an observer as it is, and provide realistic expression. A stereoscopic image display technique is broadly classified as a stereoscopic method and an autostereoscopic method. In addition, the stereoscopic method can be sub-classified as a polarizing glass method, and a liquid crystal shutter glass method, and the autostereoscopic method may be sub-classified as a binocular/multiview binocular parallax method, a volumetric method, and a holographic method.

SUMMARY OF THE INVENTION

1. Technical Problem

The present invention is directed to providing an optical filter and a stereoscopic display device.

2. Technical Solution

In one aspect, an exemplary optical filter may include a first region and a second region, which have different retardation characteristics, and a third region having a different retardation characteristic from those of first and second regions or a scattering function. In the specification, the "regions having different retardation characteristics" means that when all of target regions have retardation characteristics, respective regions have optical axes formed in the same or different directions and retardation levels are different from each other, or have optical axes formed in different directions and the retardation levels are the same. In another example, the "regions having different retardation characteristics" may include the case that any one of target regions is a region having a retardation characteristic, and other regions have no retardation characteristics, for example, optically isotropic regions. In one example, the first and second regions have different retardation characteristics, and thus, when linear polarized light is incident, it may be divided into two kinds of light having substantially perpendicular polarization axes, or when linear polarized light is incident, it may be divided into circularly polarized light having opposite rotation directions or elliptically polarized light having opposite rotation directions.

The optical filter may be, for example, an optical filter for a stereoscopic display device applied to a stereoscopic display device.

In one example, the stereoscopic display device (hereinafter, simply referred as a display device) may include, as shown in FIG. 2, a light source 4, a display element 2 and an optical filter 1. When the display device is a polarizing glass type, the observer can see a stereoscopic image output from the display device by wearing polarizing glasses.

In the display device, the light source 4 may emit non-polarized light toward the display element 2 in a driving state. The term "driving state" of the display device may mean a state in which the display device is operated to display an image, for example, a stereoscopic image.

Polarizing plates 3A and 3B may be disposed on both sides of the display element 2. Hereinafter, in the specification, the polarizing plate 3A disposed between the display element 2 and the light source 4 is called a "first polarizing plate," and the polarizing plate 3B disposed between the display element 2 and the optical filter 1 may be called a "second polarizing plate." Each of the first and second polarizing plates 3A and 3B may have, for example, a transmission axis and an absorption axis perpendicular to the transmission axis. In addition, the transmission axes of the first and second polarizing plates may be disposed in the display device in different directions, for example, in directions perpendicular to each other.

The term "vertical," "horizontal," "perpendicular," or "parallel" used herein to define an angle may refer to substantially vertical, horizontal, perpendicular, or parallel within a range capable of ensuring a desired effect. The terms take a manufacturing error or variation into account. Accordingly, for example, each term may permit an error within approximately ±15, ±10, ±5, or ±3 degrees.

In the display device, when light emitted from the light source 4 is incident to the first polarizing plate 3A, only linearly polarized light parallel to the transmission axis of the first polarizing plate can be delivered to the display element 2.

In one example, the display element 2 may be a transparent liquid crystal panel including a liquid crystal layer between two substrates. The liquid crystal panel may include, for example, a first substrate 24, a pixel electrode, a first alignment layer, a liquid crystal layer, a second alignment layer, a common electrode, and a second substrate 25, which are sequentially disposed from the light source 4. In the first substrate, for example, an active driving circuit including a thin film transistor (TFT) and an interconnection may be formed as a driving element electrically connected to a transparent pixel electrode. The pixel electrode may include, for example, a metal oxide such as indium tin oxide (ITO), and serve as an electrode for each pixel. In addition, for example, the first or second alignment layer may serve to align liquid crystals of the liquid crystal layer. The liquid crystal layer may include, for example, vertical alignment (VA), twisted nematic (TN), super twisted nematic (STN), or in plane switching (IPS)-mode liquid crystals. The liquid crystal layer may serve to transmit or block light emitted from the light source 4 by pixels due to a voltage applied from the driving circuit. The common electrode may serve as, for example, a common counter electrode.

The display element 2 may include a region 21 (hereinafter, referred to as an "UR region") capable of generating a signal for the right eye (hereinafter, referred to as an "R signal") and a region 22 (hereinafter, referred to as an "UL region") capable of generating a signal for the left eye (hereinafter, referred to as an "L signal") in a driving state, and each of the UR and UL regions 21 and 22 may include at least one pixel. For example, in the liquid crystal panel, the UR or UL region may be formed of at least one unit pixel including liquid crystals enclosed between the first and second alignment layers. The UR and UL regions may be disposed in a column and/or row direction(s).

The UR and UL regions may be formed in a stripe shape extending in the common direction, and may be adjacently and alternately disposed. In another example, the UR and UL regions may be, as shown in FIG. 4, may be adjacently and alternately disposed in a lattice pattern.

The exemplary display element may also include a light transmittance control region 23 in FIG. 2 (hereinafter, referred to as a "TC region") adjacent to the UR and UL regions. The term "TC region" may refer to a region formed to block incident light, or absorb a part of incident light and transmit the other part of the light. The TC region may refer to, for example, a region having a transmittance of incident light, that is, a light transmittance of 0 to 20, 0 to 15, 0 to 10, or 0 to 5%.

The TC region may be, for example, a black matrix. For example, when the display element 2 is a transparent liquid crystal panel, the TC region may be a black matrix included in a color filter conventionally present on the second substrate which can be formed in the liquid crystal panel as described above. In one example, the TC region may be a region formed to include chromium (Cr), a bilayer of chromium and a chromium oxide (Cr/CrOx bilayer), carbon black, a resin layer including a pigment such as carbon pigment, or graphite. A method of forming the TC region using the above-described materials is not particularly limited. For example, the TC region may be formed by a conventional method for forming a black matrix, such as photolithography or a lift-off method.

The sentence "the TC region is adjacent to the UR and UL regions" may mean that the TC region is present at such a position that, when an image is observed at least any one angle included in a viewing angle range, during delivery of an R signal and/or an L signal generated in the UR and/or UL region(s), at least a part of the R and/or L signal(s) is incident to the TC region, and the signal incident to the TC region is blocked by the TC region or only a part of the single incident to the TC region is transmitted to the optical filter through the TC region. In one example, as shown in FIG. 3, when the UR and UL regions are formed in a stripe pattern, the TC region may be, as shown in FIG. 5, formed between the UR and UL regions. In another example, as show in FIG. 4, when the UR and UL regions are formed in a lattice pattern, the TC region may be, as shown in FIG. 6, formed between the UR and UL regions.

The term "viewing angle" may refer to the range of an angle in which the L signal generated in the UL region can be transmitted through a signal polarization control region for the left eye (hereinafter, referred to as an "FL region") of an optical filter, but not transmitted through a signal polarization control region for the right eye (hereinafter, referred to as a "FR region") and then delivered to the observer, or the range of an angle in which the R signal generated in the UR region may be transmitted through the FR region of the optical filter, not through the FL region, and then delivered to the observer. At an angle exceeding the viewing angle, crosstalk phenomenon in which the L signal is transmitted through the FR region, or the R signal is transmitted through the FL region and then delivered to the observer, may occur, resulting in degrading an image quality. Here, the FR and FL regions may be regions of the optical filter capable of outputting the R and L signals by differently controlling polarization states thereof, and for example, when the optical filter is applied to a display device, any one of the first and second regions may serve as an FR region, and the other region may serve as an FL region.

In one example, the TC region present adjacent to the UR and UL regions may be placed between the UR and UL regions. As an example of the placement of the TC region present between the UR and UL regions, the UR, TC, and UL regions are sequentially placed on the same plane, or the TC region is placed on a top or bottom surface of the plane having the UR and UL regions. When the TC region is present on a top or bottom surface of the plane having the UR and UL regions, according to a front view, the TC region may seem to overlap at least a part of the UR and/or UL region(s).

When light linearly polarized through the first polarizing plate 3A is transmitted through the UR region 21 of the display element 2, it can be converted into an R signal, and when the linearly polarized light is transmitted through the UL region 22 of the display element 2, it can be converted into an L signal.

When the R and L signals are incident from the display element 2, the second polarizing plate 3B can penetrate only linearly polarized light parallel to the transmission axis of the second polarizing plate 3B.

The optical filter 1 may divide the incident light into at least two kinds of light having different polarization states, for example, two kinds of light linearly polarized in a direction perpendicular to each other as described above, or circularly or elliptically polarized in an opposite rotation direction to each other.

For example, the optical filter may be disposed such that the R signal can be incident to the FR region through the second polarizing plate 3B, and the L signal can be incident to the FL region through the second polarizing plate 3B. The R and L signals respectively incident to the FR and FL regions of the optical filter are emitted by differently changing polarization states, and the observer can recognize a stereoscopic image as an observer observed the signals with wearing polarizing glasses.

The optical filter may include, for example, a polarization control layer. In the polarization control layer, the above-described first to third regions may be formed.

The first and second regions may be, for example, formed in a stripe shape extending in a common direction, and may be adjacently and alternately disposed. FIG. 7 shows a first region 11 and a second region 12, which are disposed as described above. In addition, in another example, as shown in FIG. 8, the first and second regions 11 and 12 may be disposed adjacently and alternately, for example, in a lattice pattern.

The third region may be placed, for example, on the boundary between the first and second regions disposed as described above. FIG. 9 is a diagram illustrated again in consideration of the presence of the third region 13 in the states of the first and second regions as shown in FIG. 7, FIG. 10 is a diagram illustrated again in consideration of the presence of the third region 13 in the states of the first and second regions as illustrated in FIG. 8.

For example, when the linearly polarized light is transmitted through the first and second regions, respectively, it can be emitted as light linearly polarized in a direction substantially perpendicular to each other. In another example, when the linearly polarized light is transmitted through the first and second regions, respectively, any one of light transmitted through the first region and the second region may be emitted in a state of a left-circularly polarized light or a left-elliptically polarized light, and the other light may be emitted in a state of a right-circularly polarized light or a right-elliptically polarized light. To this end, at least one of the first and second regions may include a retardation layer. For example, to produce left- and right-circularly polarized signals, all of the first and second regions may include retardation layers, and the retardation layer included in the first region and the retardation layer included in the second region may be ¼ wavelength layers. To generate circularly polarized light or elliptically polarized light rotating in opposite directions, an optical axis of the ¼ wavelength layer disposed in the first region and an optical axis of the ¼ wavelength layer disposed in the second region may be formed in different directions. In one example, the first region may include the ¼ wavelength layer having an optical axis in a first direction as the retardation layer, and the second region may include the ¼ wavelength layer having an optical axis in a second direction different from the first direction as the retardation layer. The term "n wavelength layer" used herein may refer to a retardation element capable of retarding the incident light n times a wavelength of the incident light. Here, n may be, for example, ½, ¼, or ¾. In addition, the term "optical axis" used herein may refer to a slow axis or a fast axis in a process of transmitting light through a corresponding region, and may be, for example, a slow axis.

The aspects of the first and second regions are not limited to those described above. For example, when one of the first and second regions includes a ¾ wavelength layer, and the other includes a ¼ wavelength layer, left- and right-circularly polarized light may be generated.

In another example, one of the first and second regions may be a ½ wavelength layer, and the other may be an optically isotropic region. In this case, the R and L signals respectively transmitted through the first and second regions may be emitted from the optical filter in the form of linearly polarized light to have polarization axes in substantially perpendicular directions to each other.

The polarization control layer, for example, the wavelength layer forming the first and/or second regions, and the third region in some cases, may be, for example, a liquid crystal layer. For example, a liquid crystal compound exhibiting a retardation characteristic may be aligned, and polymerized, when needed, thereby forming the first and/or second region(s).

The liquid crystal layer may include, for example, a polymerizable liquid crystal compound. In one example, the liquid crystal layer may include the polymerizable liquid crystal compound in a polymerized form. The term "polymerizable liquid crystal compound" may be a compound including a part capable of exhibiting liquid crystallinity, for example, a mesogen backbone, and at least one polymerizable functional group. In addition, the "polymerizable liquid crystal compound is included in a polymerized form" may mean that the liquid crystal compound is polymerized, thereby forming a backbone such as a main or side chain of a liquid crystal polymer in the liquid crystal layer.

The liquid crystal layer may also include a polymerizable liquid crystal compound in a m-polymerized state, or additionally include a known additive such as a polymerizable non-liquid crystal compound, a stabilizer, a non-polymerizable non-liquid crystal compound, or an initiator.

In one example, the polymerizable liquid crystal compound included in the liquid crystal layer may include a multifunctional polymerizable liquid crystal compound and a monofunctional polymerizable liquid crystal compound.

The term "multifunctional polymerizable liquid crystal compound" may refer to a compound including at least two polymerizable functional groups among liquid crystal compounds. In one example, the multifunctional polymerizable liquid crystal compound may include 2 to 10, 2 to 8, 2 to 6, 2 to 5, 2 to 4, 2 to 3, or 2 polymerizable functional groups. In addition, the term "monofunctional polymerizable liquid crystal compound" may refer to a compound including one polymerizable functional group among the liquid crystal compounds. When the multifunctional and monofunctional polymerizable compounds are used together, the retardation characteristic of the liquid crystal later can be effectively controlled, and the implemented retardation characteristic, for example, an optical axis or a retardation value of the retardation layer can be stably maintained. The term "optical axis" used herein may refer to a slow axis or a fast axis when light is transmitted to a corresponding region.

The liquid crystal layer may include the monofunctional polymerizable liquid crystal compound in an amount of more than 0 to 100, 1 to 90, 1 to 80, 1 to 70, 1 to 60, 1 to 50, 1 to 30, or 1 to 20 parts by weight with respect to 100 parts by weight of the multifunctional polymerizable crystal compound.

In the above range, an effect of combining the multifunctional and monofunctional polymerizable liquid crystal compounds can be maximized, and the desired retardation value and optical axis can be stably maintained. Unless defined otherwise herein, the unit "parts by weight" may mean a weight ratio.

In one example, the multifunctional or monofunctional polymerizable liquid crystal compound may be a compound represented by Formula 1.

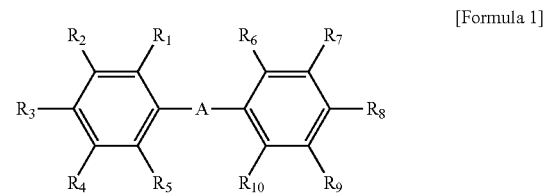

[Formula 1]

In Formula 1, A is a single bond, —COO—, or —OCO—, and $R_1$ to $R_{10}$ are each independently hydrogen, halogen, an alkyl group, an alkoxy group, an alkoxycarbonyl group, a cyano group, a nitro group, —O-Q-P, or a substituent of Formula 2, in which a pair of adjacent substituents of $R_1$ to $R_5$ or a pair of adjacent substituents of $R_6$ to $R_{10}$ are connected to form a benzene substituted with —O-Q-P, at least one of $R_1$ to $R_{10}$ is —O-Q-P or a substituent of Formula 2, or a pair of adjacent substituents of $R_1$ to $R_5$ or a pair of adjacent substituents of $R_6$ to $R_{10}$ are connected to form benzene substituted with —O-Q-P. Here, Q is an alkylene group or an alkylidene group, and P is a polymerizable functional group such as an alkenyl group, an epoxy group, a cyano group, a carboxyl group, an acryloyl group, a methacryloyl group, an acryloyloxy group, or a methacryloyloxy group.

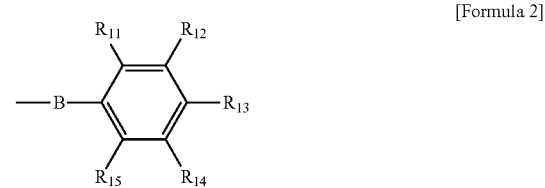

[Formula 2]

In Formula 2, B is a single bond, —COO—, or —OCO—, and $R_{11}$ to $R_{15}$ are each independently hydrogen, halogen, an alkyl group, an alkoxy group, an alkoxycarbonyl group, a cyano group, a nitro group, or —O-Q-P, in which a pair of adjacent substituents of $R_{11}$ to $R_{15}$ are connected to form benzene substituted with —O-Q-P at least one of $R_{11}$ to $R_{15}$ is —O-Q-P, or a pair of adjacent substituents of $R_{11}$ to $R_{15}$ are connected to form benzene substituted with —O-Q-P. Here, Q is an alkylene group or an alkylidene group, and P is a polymerizable functional group such as an alkenyl group, an epoxy group, a cyano group, a carboxyl group, an acryloyl group, a methacryloyl group, an acryloyloxy group, or a methacryloyloxy group.

In Formulas 1 and 2, the forming of benzene substituted with —O-Q-P by connecting two adjacent substituents may mean that two adjacent substituents are connected to each other, and thereby a naphthalene backbone overall substituted with —O-Q-P is formed.

In Formula 2, the mark "—" on the left of B may indicate that B is directly connected to the benzene of Formula 1.

In Formulas 1 and 2, the term "single bond" refers that there is no atom at the part represented as A or B. For example, in Formula 1, when A is a single bond, the benzenes at both sides of A may be directly connected to each other, thereby forming a biphenyl structure.

In Formulas 1 and 2, the halogen may be chlorine, bromine, or iodine.

The term "alkyl group" may be, unless particularly defined otherwise, a linear or branched alkyl group having 1 to 20, 1 to 16, 1 to 12, 1 to 8, or 1 to 4 carbon atoms, or a cycloalkyl group having 3 to 20, 3 to 16, or 4 to 12 carbon atoms. The alkyl group may be optionally substituted with at least one substituent.

The term "alkoxy group" may be, unless particularly defined otherwise, an alkoxy group having 1 to 20, 1 to 16, 1 to 12, 1 to 8, or 1 to 4 carbon atoms. The alkoxy group may be a linear, branched, or cyclic type. In addition, the alkoxy group may be optionally substituted with at least one substituent.

The term "alkylene group" or "alkylidene group" may be, unless particularly defined otherwise, an alkylene or alkylidene group having 1 to 12, 4 to 10, or 6 to 9 carbon atoms. The alkylene or alkylidene group may be a linear, branched, or cyclic type. In addition, the alkylene or alkylidene group may be optionally substituted with at least one substituent.

In addition, the term "alkenyl group" may be, unless particularly defined otherwise, an alkenyl group having 2 to 20, 2 to 16, 2 to 12, 2 to 8, or 2 to 4 carbon atoms. The alkenyl group may be a linear, branched, or cyclic type. In addition, the alkenyl group may be optionally substituted with at least one substituent.

In addition, in Formulas 1 and 2, P may be an acryloyl group, a methacryloyl group, an acryloyloxy group, or a methacryloyloxy group, preferably, an acryloyloxy group or a methacryloyloxy group, and more preferably, an acryloyloxy group.

In the specification, as a substituent capable of being substituted with a specific functional group, an alkyl group, an alkoxy group, an alkenyl group, an epoxy group, an oxo group, an ocetanyl group, a thiol group, a cyano group, a carboxyl group, an acryloyl group, a methacryloyl group, an acryloyloxy group, a methacryloyloxy group, or an aryl group may be used, but the present invention is not limited thereto.

The —O-Q-P which may be at least one in Formulas 1 and 2, or the residue of Formula 2 may be present at $R_3$, $R_8$, or $R_{13}$ position. In addition, the substituents which are connected to each other and thus constitute the benzene substituted with —O-Q-P, may be $R_3$ and $R_4$ or $R_{12}$ and $R_{13}$. Moreover, in the compound of Formula 1 or the residue of Formula 2, a substituent, other than —O-Q-P or the residue of Formula 2, or a substituent, other than the substituents connected to form benzene, may be hydrogen, halogen, a linear or branched alkyl group having 1 to 4 carbon atoms, an alkoxycarbonyl group including a linear or branched alkoxy group having 1 to 4 carbon atoms, a cycloalkyl group having 4 to 12 carbon atoms, an alkoxy group having 1 to 4 carbon atoms, a cyano group, or a nitro group, and in another example, chlorine, a linear or branched alkyl group having 1 to 4 carbon atoms, a cycloalkyl group having 4 to 12 carbon atoms, an alkoxy group having 1 to 4 carbon atoms, an alkoxycarbonyl group including a linear or branched alkoxy group having 1 to 4 carbon atoms, or a cyano group.

The polymerizable liquid crystal compound may be included in the liquid crystal layer in a parallel alignment state. In one example, the compound may be included in the liquid crystal layer polymerized in a parallel alignment state. The term "parallel alignment" used herein may mean that an optical axis of the liquid crystal layer including the liquid crystal compound has a tilt angle of approximately 0 to 25, 0 to 15, 0 to 10, 0 to 5, or 0 degrees based on the plane of the liquid crystal layer.

In one example, the liquid crystal layer of the polarization control layer, for example, the first and/or second region(s), may have a difference in an in-plane refractive index between a slow axis direction and a fast axis direction within a range of 0.05 to 0.2, 0.07 to 0.2, 0.09 to 0.2, or 0.1 to 0.2. The in-plane refractive index in the slow axis direction may refer to a refractive index in a direction exhibiting the highest refractive index on a plane of the liquid crystal layer, and the in-plane refractive index in the fast axis direction may refer to a refractive index in a direction exhibiting the lowest refractive index on a plane of the liquid crystal layer. Usually, the fast axis is perpendicular to the slow axis in the optically-anisotropic liquid crystal layer. The refractive indexes may be measured with respect to light with wavelengths of 550 and 589 nm, respectively. The difference in refractive index may be measured according to a manufacturer's manual using Axoscan produced by Axomatrix. In addition, the liquid crystal layer may have a thickness of approximately 0.5 to 2.0 μm or 0.5 to 1.5 μm. The liquid crystal layer having the relationship of the refractive indexes and the thickness may realize a phase retardation characteristic suitable for a purpose to be applied. In one example, the liquid crystal layer having the relationship of the refractive indexes and the thickness may be suitable for an optical element for dividing light.

The third region that can be present on the boundary between the first and second regions may be, for example, a region having a retardation characteristic different from the first and second region, or a region having no retardation characteristic or having a scattering function. For example, the third region may output incident linearly polarized light as linearly polarized light, or as non-polarized light. When the third region emits linearly polarized light in a linearly polarized state, for example, when the first and second regions generate light linearly polarized in directions substantially perpendicular to each other, they can emit linearly polarized light in a third direction different from optical axes of the light linearly polarized in directions perpendicular to each other.

For example, when the optical filter is applied to a stereoscopic display device, and light transmitted through the third region is observed by wearing polarizing glasses, the light may be transmitted through the polarizing glasses at an intensity decreased with respect to the light transmitted through the first and second regions, or blocked. Accordingly, the display device including the optical filter may reduce, for example, crosstalk. In one example, the light emitted from the third region may be transmitted through the polarizing glasses in an amount decreased approximately 30% or more, 30 to 80%, 30 to 75%, 30 to 70%, 30 to 65%, 30 to 60%, 30 to 55%, 35 to 80%, 40 to 80%, 45 to 80%, 35 to 75%, 35 to 70%, 40 to 65%, 40 to 60%, 45 to 55%, or approximately 50% with respect to the light output from the first or second region.

The third region may be, for example, an isotropic region, a retardation region, or a light scattering region. When the third region is an isotropic region, for example, a polarization control layer such as a liquid crystal layer may be present only in a region corresponding to the first and/or second region(s), or glass or an isotropic material may be present in a region corresponding to the third region.

When the third region is a retardation region or a light scattering region, the third region may be the liquid crystal layer as described above.

For example, all of the first to third regions may be liquid crystal layers. In this case, for example, the first region may have an optical axis formed in a first direction, the second region may have an optical axis formed in a second direction the same as or different from the first direction, and the third region may be a region having an optical axis in a third direction different from the first and second directions.

In this case, for example, the first and second directions are different from, and perpendicular to each other. For example, the first and second directions may be different from each other, and the third direction may be formed in a direction substantially parallel or perpendicular to a line bisecting an angle made between the first and second directions. That is, the third direction may satisfy the condition of General Formula 1.

$$2 \times A = (R+L)$$ [General Formula 1]

In General Formula 1, A is an angle between the third direction and an optional virtual line, which is measured clockwise from the virtual line on a plane of the optical filter, R is an angle between the virtual line and the first direction, which is measured clockwise from the virtual line, and L is an angle between the second direction and the virtual line measured clockwise from the virtual line.

For example, when the optical filter is a filter applied to the above-described display device, the virtual line may be formed in a direction parallel to an optical absorption axis of a polarizing plate, for example, a second polarizing plate, of the display device.

A method for the third region to have the above optical axis is not particularly limited. For example, in the following process of aligning liquid crystals, when each of directions of aligning first to third regions is controlled, the third region may be formed as described above. As long as the third region has the optical axis described above, retardation thereof is not particularly limited, and for example, in consideration of processability, the third region may have the same retardation as those of the first and/or second region(s).

When the third region is a scattering region, a scattering material may be present in a part corresponding to the third region. As an example of the scattering material, a non-aligned liquid crystal compound may be used. That is, the first and/or second region(s) of the optical filter, as described above, may be an aligned liquid crystal region, and the third region may be a non-aligned liquid crystal region. Such a third region may be formed without alignment of a liquid crystal compound in a part corresponding to the third region in the following process of aligning liquid crystals.

The optical filter may further include a base layer. The above-described polarization control layer may be formed, for example, on the base layer.

As the base layer, for example, a glass base layer or a plastic film or sheet may be used. As the plastic film or sheet, for example, a film or sheet having a transmittance with respect to light of a visible region of approximately 80% or more or 85% or more may be used.

As the film or sheet, a triacetyl cellulose (TAC) film or sheet; a cyclo olefin polymer (COP) film or sheet such as a norbornene derivative film or sheet; a poly(methyl methacrylate) (PMMA) film or sheet; a polycarbonate (PC) film or sheet; a polyethylene (PE) film or sheet; a polypropylene (PP) film or sheet; a polyvinyl alcohol (PVA) film or sheet; a diacetyl cellulose (DAC) film or sheet; a polyacrylate (Pac) film or sheet; a polyethersulfone (PES) film or sheet; a polyetheretherketone (PEEK) film or sheet; a polyetherimide (PET) film or sheet; a polyethylenenaphthalate (PEN) film or sheet; a polyethyleneterephthalate (PET) film or sheet; a polyimide (PI) film or sheet; a polysulfone (PSF) film or sheet; a polyvinylalcohol (PVA) film or sheet; a polyarylate (PAR) film or sheet; or an amorphous fluorine resin film or sheet may be used.

When the polarization control layer is the liquid crystal layer, the optical filter may further include an alignment layer between the base layer and the liquid crystal layer.

The alignment layer may be a layer serving to control an optical axis of the liquid crystal layer by controlling an alignment direction in an alignment process of the liquid crystal layer. As the alignment layer, a conventional alignment film known in the art may be used. As the alignment layer, an optical alignment layer capable of determining alignment by isomerization, fries rearrangement, or dimerization induced by radiation of linearly polarized light and inducing alignment to an adjacent liquid crystal layer by the determined alignment, a polymer layer such as rubbed polyimide layer, or an acrylic curable resin layer in which a plurality of groove regions are patterned may be used.

The optical filter may be, for example, manufactured by forming an alignment layer on the base layer, and forming a liquid crystal layer on the alignment layer. In this process, the first to third regions may be formed by controlling a region for forming the alignment layer, or an alignment direction.

In this field, various kinds or methods of forming an alignment layer to manufacture a liquid crystal film, and methods of forming a liquid crystal layer using the same are known, and may be employed to the present invention.

In another aspect, a display device, for example, a stereoscopic display device, is provided. The display device may include the optical filter.

The display device may include, for example, the display element including the UR and UL regions capable of generating R and L signals, respectively, and the optical filter. In addition, the display element may include the above-described TC region.

In a driving state of the device, the optical filter may be disposed such that an R signal is incident to any one of the first and second regions, and an L signal is incident to the other one of the first and second regions.

Detailed description of each part of the display device may be applied as described above.

The optical filter of the display device may include a third region and may be disposed in the display device to have both of the maximum values of an angle "$\theta_U$" satisfying Equation 1 and an angle "$\theta_L$" satisfying Equation 2 of 3, 5, 8, 8, 5, 9, 9.5, 10, 10.5, 11, 11.5, 12, 12.5, 13, 13.5, 14, 14.5, or 15 degrees or more.

$$\tan \theta_U = (H_1 + 2y)/2T$$ [Equation 1]

$$\tan \theta_L = (H_1 + 2H_2 - 2y)/2T$$ [Equation 2]

In Equations 1 and 2, $H_1$ is a width of a TC region, $H_2$ is a width of the third region, T is a distance from the TC region of the display element to the third region of the optical filter, and y is a distance between a position at which a virtual normal line with respect to a surface of the TC region of a line bisecting the width of the TC region is in contact with the third region and apart having the third region.

Equations 1 and 2 will be described with reference to FIG. 11.

Referring to FIG. 11, it can be seen that a range ($\theta_U$) of angles at which an L signal of the display element can be delivered to an observer without being transmitted through a first region 11, or a range ($\theta_L$) of angles at which an R signal of the display element can be delivered to the observer without being transmitted through a second region 12 can be determined by a distance T between a TC region 23 and a third region 13, and widths of the TC region 23 and the third region 13. Here, the distance T may be, for example, a distance between a surface of the TC region facing the optical filter and a surface facing the display element of the optical filter.

The distance T is determined by the specification of a display device, but the present invention is not particularly limited thereto. For example, the distance T may be approximately 5 mm or less or approximately 0.5 mm to 5 mm. In addition, widths of UR, UL, and TC regions or widths of first to third regions may also be determined within a suitable range depending on the specifications of the display device. For example, in the case of an optical filter applied to an approximately 42 to 50-inch display device, widths of the first and second regions may be controlled within approximately 50 to 1000, 50 to 750, or 100 to 500 μm. In addition, for example, a width of the third region may be controlled within approximately 50 to 150, 50 to 120, or 70 to 120 μm. Accordingly, the widths of the UR, UL, and TC regions may be controlled, for example, within equivalent ranges in consideration of the widths of the first to third regions.

Referring to FIG. 11, it can be seen that the angles "$\theta_U$" and "$\theta_L$" can be determined by widths ($H_1$ and $H_2$) and relative positions of the TC and third regions, when the distance T is identical to each other.

Referring to FIG. 11, it is seen that the viewing angle "$\theta_U$" is determined for $\tan \theta_U$ to be the same as a value obtained by dividing the sum ($H_1/2+y$) of a value of half of the width $H_1$ of the TC region and the distance y from a point at which a virtual normal line C of a line bisecting the width of the TC region with respect to a surface of the TC region or display element is in contact with the third region to a part in which the third region is present by the distance T. In addition, it is seen that the viewing angle "$\theta_L$" is determined for $\tan \theta_L$ to be the same as a value obtained by dividing the sum ($H_1/2+H_{2-y}$) of a value of half of the width $H_1$ of the TC region and a value ($H_{2-y}$) obtained by subtracting the distance y from a point at which a virtual normal line C of a line bisecting the width $H_1$ of the TC region with respect to a surface of the TC region or display element is in contact with the third region to a part in which the third region is present from the width $H_2$ of the third region, by the distance T.

In the display device including the TC and third regions, sizes, for example, widths, and relative positions of the TC and third regions may be suitably controlled to ensure a wide viewing angle and excellent brightness characteristics when a stereoscopic image is observed.

Accordingly, in the display device, relative brightness, when observed from front, may be 60, 65, or 70% or more, and at the same time, the maximum value of the angle "$\theta_U$" satisfying Equation 1 and the maximum value of the angle "$\theta_L$" satisfying Equation 2 may be approximately 3, 5, 8, 8.5, 9, 9.5, 10, 10.5, 11, 11.5, 12, 12.5, 13, 13.5, 14, 14.5, or 15 degrees or more.

The term "relative brightness" may refer to a ratio ($I_T/I_O$) of brightness ($I_T$) in a display element including an optical filter having a third region, or including an optical filter having a third region and a TC region, to brightness ($I_O$) in a display device including an optical filter without a third region or including an optical filter without a third region and having no TC region in a display element.

3. Effect of the Invention

An exemplary optical filter is applied to, for example, a stereoscopic display device, and thus can observe a stereoscopic image at a wide viewing angel without loss of the brightness.

BRIEF DESCRIPTION OF THE DRAWINGS

Figure 3:
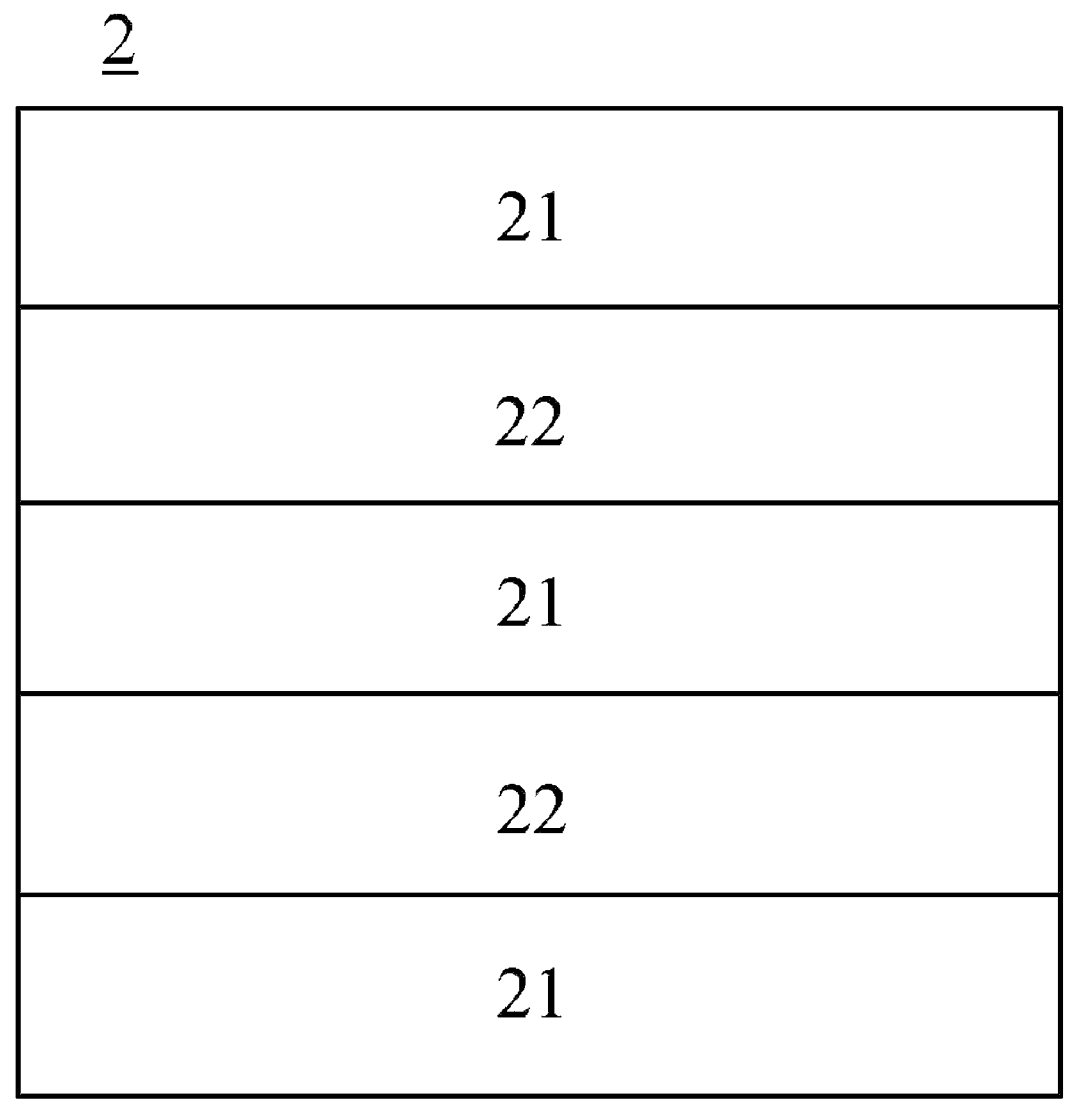

FIGS. 3 and 4 are exemplary display elements having no TC region.

Figure 7:
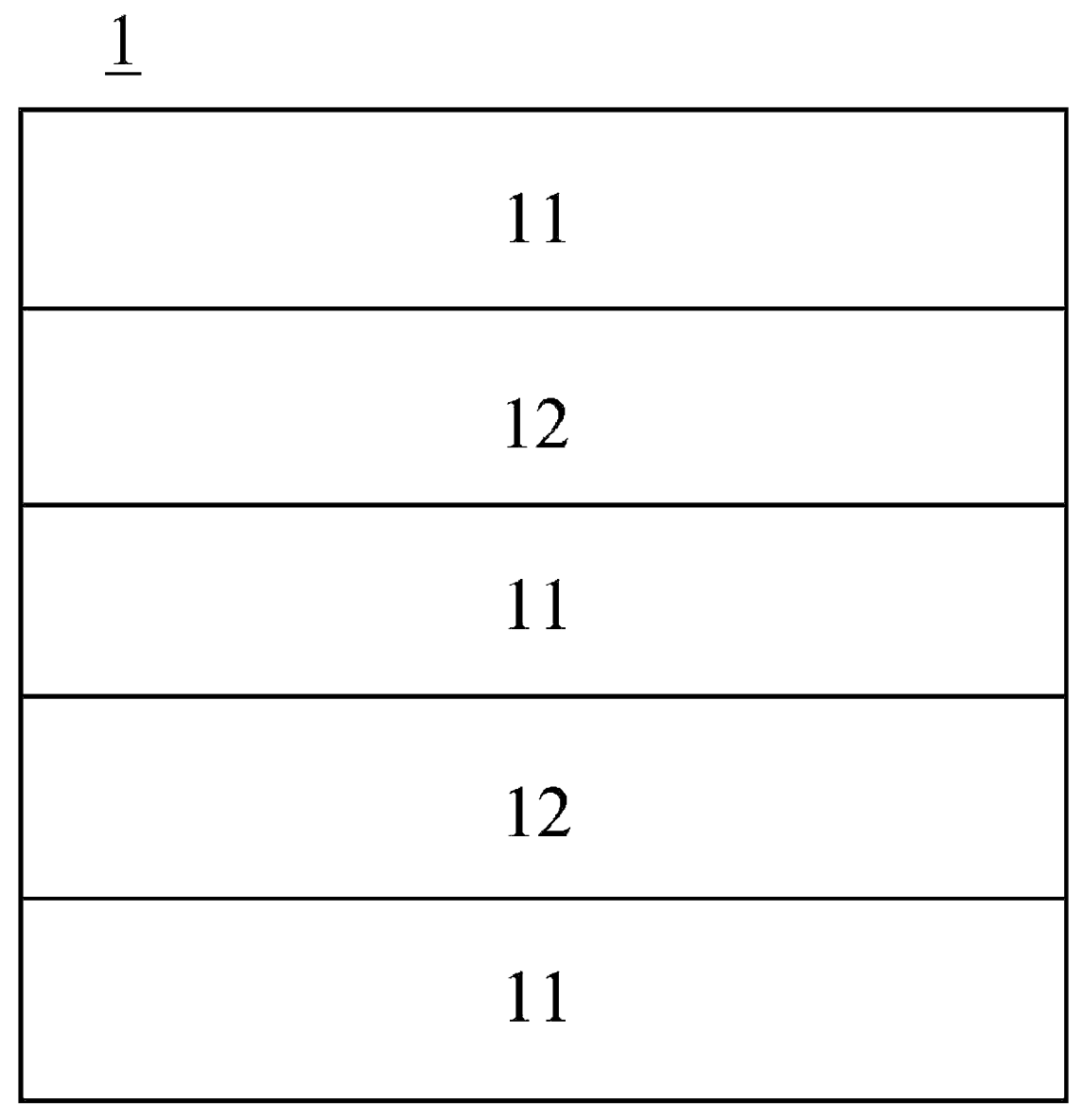

FIGS. 7 and 8 show exemplary optical filters having no third region.

Figure 1:
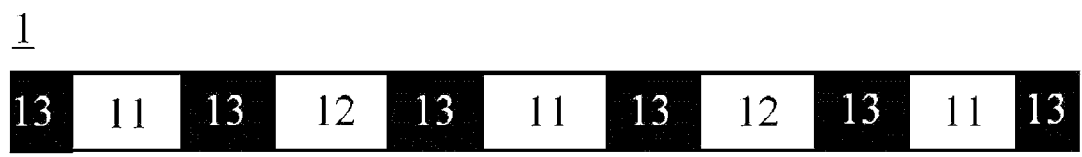
FIG. 1 is a schematic diagram of an exemplary optical filter.

EXPLANATIONS OF THE MARKS IN THE FIGS.

1: Optical filter
11: First region
12: Second region
13: Third region
2: Display element
21: UR region
22: UL region
23: TC region
24, 25: Substrate
3A, 3B: Polarizing plate
4: Light source

DETAILED DESCRIPTION OF EXEMPLARY EMBODIMENTS

Hereinafter, an optical filter will be described in detail with reference to Example and Comparative Example, but the scope of the optical filter is not limited to the following Examples.

PREPARATION EXAMPLE

Preparation of Optical Filter

A composition for forming an optical alignment layer was coated on one surface of a TAC base (refractive index: 1.49, thickness: 80,000 nm) to have a dry thickness of approximately 1,000 Å, and then dried in an 80° C. oven for 2 minutes. As the composition for forming a optical alignment layer, a composition prepared by mixing a mixture of polynorbornene (molecular weight ($M_w$)=150,000) having a cinnamate group of Formula 3 and an acryl monomer with a photoinitiator (Irgacure 907), and dissolving the resulting mixture in a toluene solvent to have a solid content of polynorbornene of 2 wt % was used (polynorbornene:acryl monomer:photoinitiator=2:1:0.25 (weight ratio)).

[Formula 3]

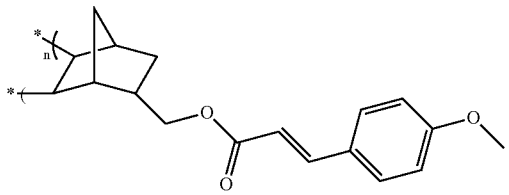

Figure 9:
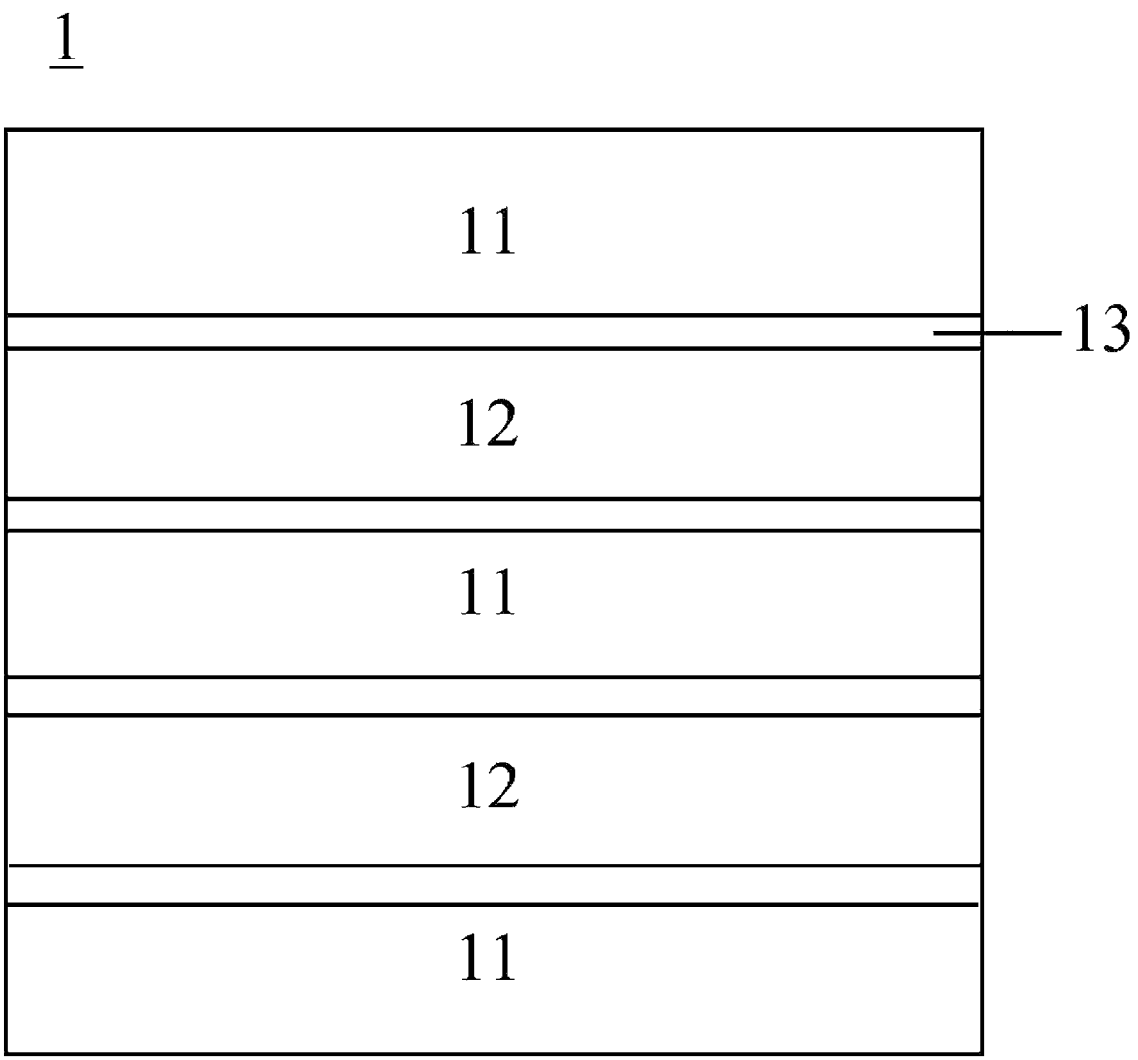
FIGS. 9 and 10 show exemplary optical filters having a third region.
Figure 10:
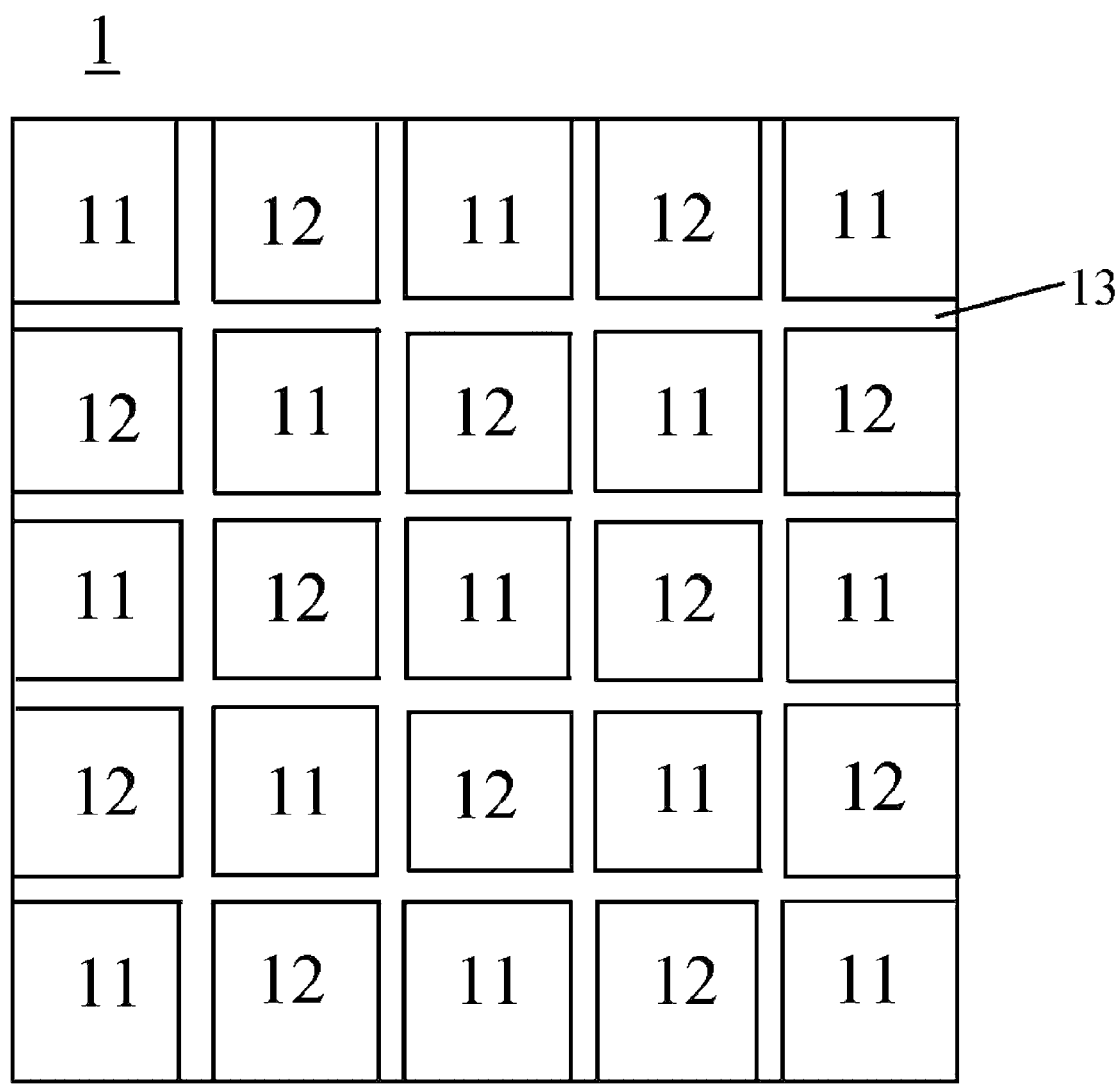

Subsequently, the dried composition for forming an optical alignment layer was aligned to form an optical alignment layer including first to third alignment regions, which were aligned in different directions. The alignment process was performed by radiation of linearly polarized light by means of a mask, and afterward, while transferring the TAC base having the optical alignment layer at a rate of approximately 3 m/min, alignment was executed by repeatedly irradiating UV rays (300 mW/cm$^2$) to the composition for forming an optical alignment layer by means of the mask. Alignment regions, as shown in FIG. 9, included first and second alignment regions, which had a stripe shape extending in the common direction and were adjacently and alternately disposed, and a third alignment region was present between the first and second alignment regions. The first and second alignment regions were aligned in a clockwise or counterclockwise direction from a direction of extending the third alignment region at an angle of 45 degrees, and the third alignment region was aligned parallel to the extension and alignment directions of the third alignment region. Subsequently, a liquid crystal layer was formed on the aligned alignment layer. Specifically, as the liquid crystal composition, a liquid crystal composition including 70 parts by weight of a multifunctional polymerizable liquid crystal compound represented by Formula 4, 30 parts by weight of a monofunctional polymerizable liquid crystal compound represented by Formula 5, and a suitable amount of a photoinitiator was coated to have a dry thickness of approximately 1 μm and then aligned according to alignment of the underlying alignment layer. Liquid crystals were crosslinked and polymerized by irradiating UV rays (300 mW/cm$^2$) for approximately 10 seconds, and thus the liquid crystal layer having first to third regions aligned according to the alignment of the underlying optical alignment layer and generally exhibiting a characteristic of a ¼ wavelength layer was formed. The first to third regions were formed to have a width of approximately 350, 350, and 100 μm, respectively.

Example 1

Figure 2:
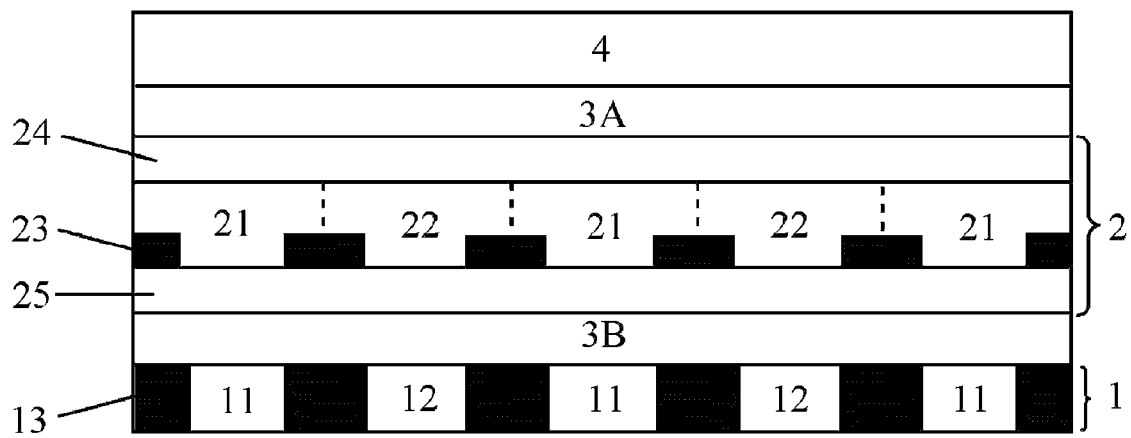
FIG. 2 is a schematic diagram of an exemplary display device.
Figure 5:
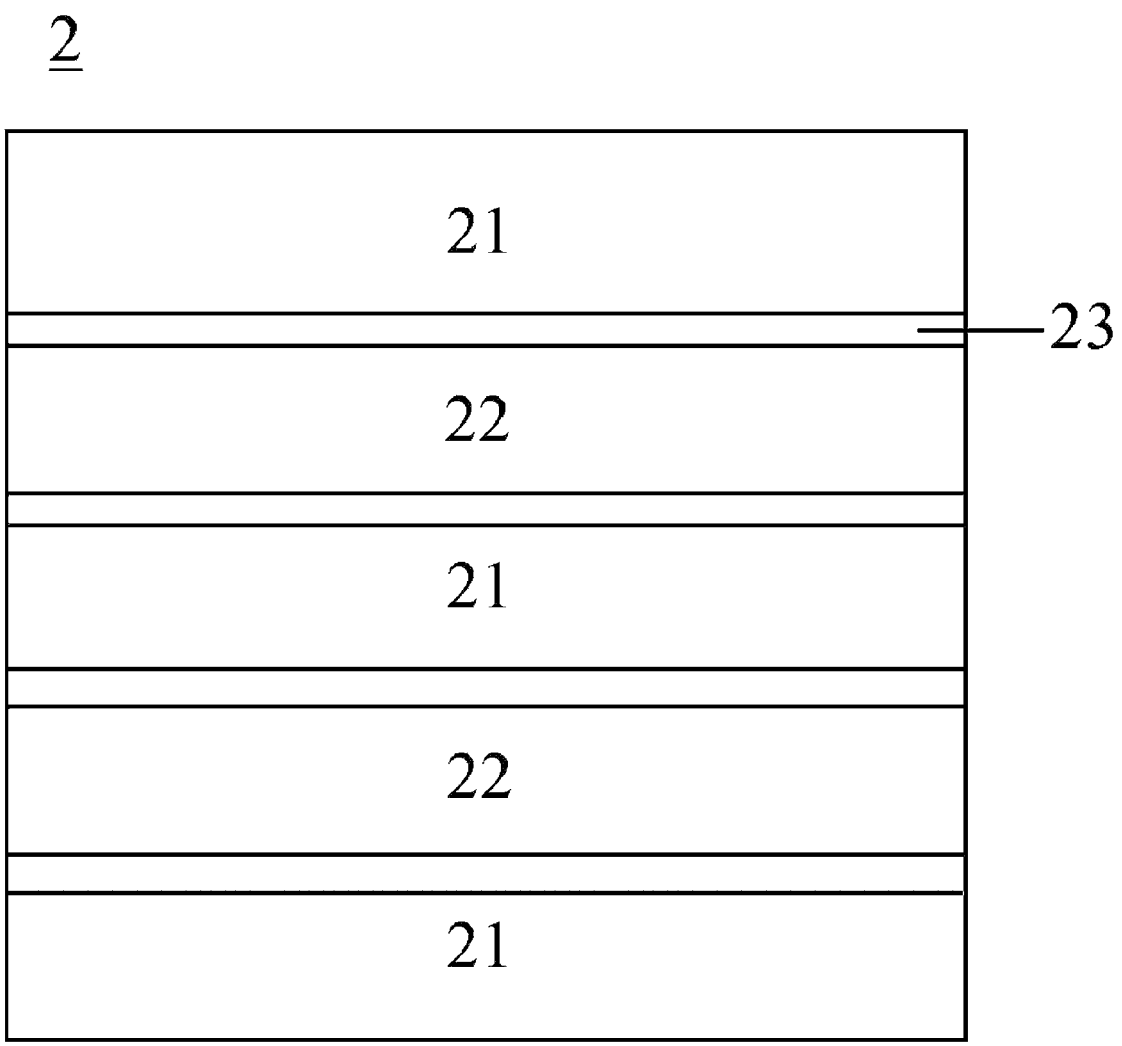
FIGS. 5 and 6 show exemplary display elements having a TC region.
Figure 6:
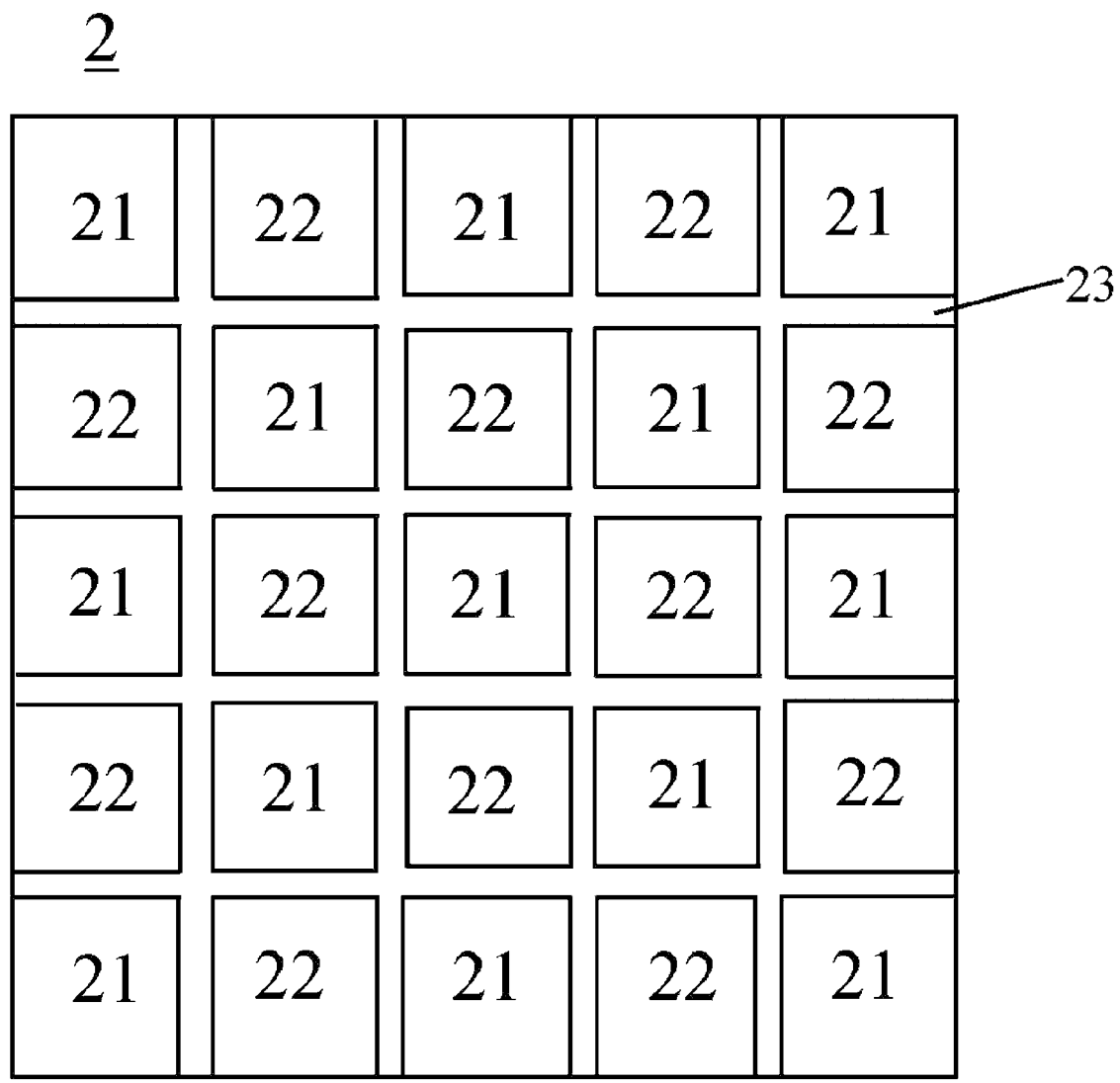
Figure 11:
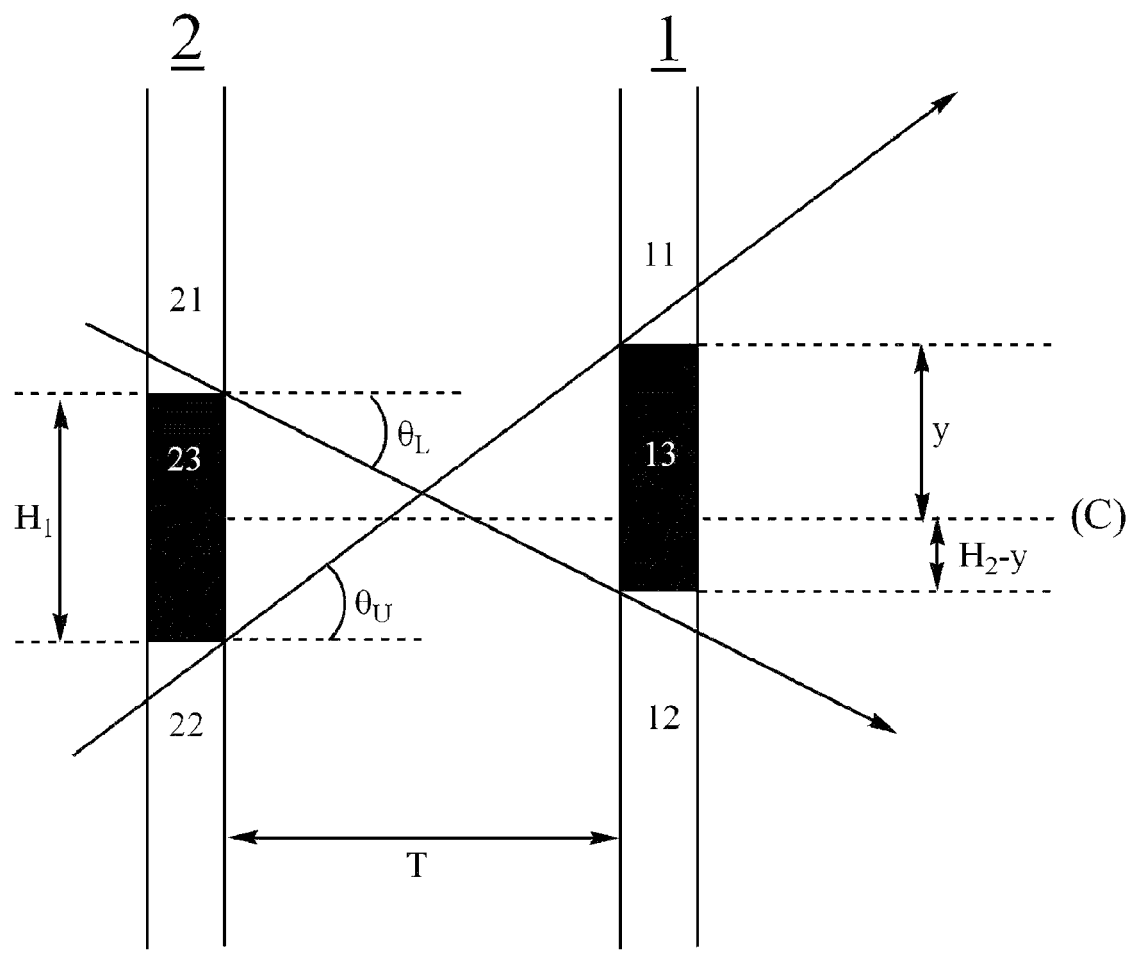
FIG. 11 is a diagram explaining Equations 1 and 2.

A device was manufactured to have a structure shown in FIG. 2, and included an optical filter 1 manufactured in Preparation Example 1, and a transparent liquid crystal panel as a display element 2. As the liquid crystal panel, a panel in which UR and UL regions were disposed in the arrangement of FIG. 5, and a TC region 23 was formed by a black matrix of a color filter of the liquid crystal panel and formed between the UR and UL regions to overlap parts thereof, was used. The TC region was formed such that a range of overlapping the UR region is equal to a range of overlapping the UL region. In addition, first to third regions 11, 12, and 13 of the optical filter 1 were disposed in the form of FIG. 9. The arrangement of the optical filter was disposed such that, for example, y was equal to H$_2$/2 in FIG. 11. A distance between the TC and third regions (T in FIG. 11) was approximately 0.7 mm.

Comparative Example 1

An optical filter was manufactured by the same method as described in Preparation Example 1, except that a third region was not formed, and a display device was manufactured by the same method as described in Example 1, except that only first and second regions were formed to have a width of approximately 450 μm.

Experimental Example 1

Effect of Improving Viewing Angle

A viewing angle was defined as an angle for generating a crosstalk of 7% or less. In Experimental Example 1, the crosstalk was measured by the following method. First, polarizing glasses were placed at an observation point of a display device. Afterward, while the display device output an L signal, a SR-UL2 Spectrometer was disposed on a back surface of lenses for the left and right eyes of the polarizing glasses, and brightness was measured. Here, the brightness measured on the back surface of the lens for the left eye is brightness in a bright state, and the brightness measured on the back surface of the lens for the right eye is brightness in a dark state. After measuring the brightness, a rate of brightness in the dark state to brightness in the bright state ([brightness in dark state]/[brightness in bright state]) was measured, and defined as a crosstalk.

[Formula 4]

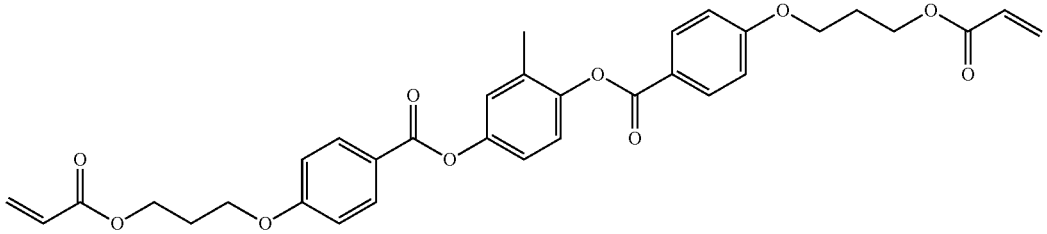

[Formula 5]

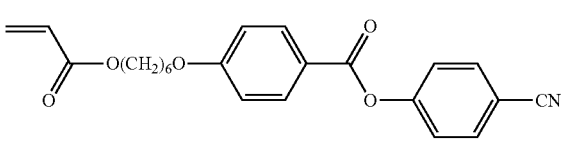

In the devices of Example 1 and Comparative Example 1, a viewing an measured by changing a width ($H_1$) of the TC region of the display element was as follows. It can be confirmed from Table 1 that devices were improved in the viewing angle by approximately 3.3 to 3.5 degrees using the optical filter.

TABLE 1

| Width ($H_1$) of TC region (µm) | Viewing angle of Comparative Example 1 (unit: degree) | Viewing angle of Example 1 (unit: degree) |
| --- | --- | --- |
| 0 | 3.5 | 7.0 |
| 25 | 4.5 | 8.0 |
| 50 | 5.5 | 9.0 |
| 75 | 6.6 | 10.0 |
| 100 | 7.6 | 11.0 |
| 125 | 8.6 | 12.0 |
| 150 | 9.6 | 13.0 |
| 175 | 10.6 | 13.9 |
| 200 | 11.5 | 14.9 |
| 225 | 12.5 | 15.8 |
| 250 | 13.5 | 16.8 |

While the invention has been shown and described with reference to certain exemplary embodiments thereof, it will be understood by those skilled in the art that various modifications in form and details may be made therein without departing from the spirit and scope of the invention as defined by the appended claims.

What is claimed is:

1. A display device, comprising:
    a display element including regions for generating signals for the right and left eyes, which can generate signals for the right and left eyes, respectively and a light transmittance control region adjacent to the regions for generating signals for the right and left eyes; and
    an optical filter having a polarization control layer, comprising:
    first and second regions that have different retardation characteristics from each other, and formed to divide incident light into two kinds of light having different polarization states, and having a difference between in-plane refractive index in a slow axis direction and a fast axis direction of 0.05 to 0.2, and a thickness of 0.5 to 2.0 µm; and
    a third region which is a retardation region satisfying General Formula 1 in relation to the first and second regions, an isotropic region having no retardation characteristics or a light scattering region:

$$2 \times A = (R+L) \quad \text{[General Formula 1]}$$

wherein, A is an angle between an optical axis of the third region and an optional virtual line, which is measured clockwise from the virtual line on a plane of the optical filter, R is an angle between the virtual line and an optical axis of the first region, which is measured clockwise from the virtual line, and L is an angle between an optical axis of the second region and the virtual line measured clockwise from the virtual line,
    wherein, in the optical filter, one of the first and second regions is disposed in a location in which the signal for the right eye is incident, and the other is disposed in a location in which the signal for the left eye is incident,
    wherein the optical filter is positioned opposite the display element and disposed to have the maximum values of an angle ($\theta_U$) satisfying Equation 1 and an angle ($\theta_L$) satisfying Equation 2 which are all 3 degrees or more:

$$\tan\theta_U = (H_1 + 2y)/2T \quad \text{[Equation 1]}$$

$$\tan\theta_L = (H_1 + 2H_2 - 2y)/2T \quad \text{[Equation 2]}$$

where $\theta_U$ is a range of angles in which the signal for the left eye generated in the region for generating signal for the left eye of the display element can be transmitted through one of the first and second regions that is disposed in the location in which the signal for the left eye is incident of the optical filter, but not transmitted through the other that is disposed in the location in which the signal for the right eye is incident of the optical filter and then delivered to an observer,
    where $\theta_L$ is a range of angles in which the signal for the right eye generated in the region for generating signal for the right eye of the display element cannot be transmitted through one of the first and second regions that is disposed in the location in which the signal for the left eye is incident of the optical filter, but can be transmitted through the other that is disposed in the location in which the signal for the right eye is incident of the optical filter and then delivered to the observer;
    where $H_1$ is a width of the light transmittance control region,
    where $H_2$ is a width of the third region of the optical filter,
    where T is a distance from the light transmittance control region to the third region of the optical filter, and
    where y is a distance between a position at which a virtual normal line with respect to a surface of the light transmittance control region of a line bisecting the width of the light transmittance control region is in contact with the third region and a part having the third region.

2. The display device according to claim 1, wherein the first and second regions are formed to divide linearly polarized incident light into two kinds of circularly polarized light or elliptically polarized light having opposite rotation directions and output the divided light.

3. The display device according to claim 1, wherein the third region is formed to output the linearly polarized incident light as linearly polarized light or non-polarized light.

4. The display device according to claim 1, wherein the first and second regions have a stripe shape extending in the common direction and are adjacently and alternately disposed, and the third region is disposed between the first and second regions.

5. The display device according to claim 1, wherein the first and second regions are adjacently and alternately disposed in a lattice shape, and the third region is disposed between the first and second regions.

6. The display device according to claim 1, wherein the first and second regions include a horizontally-aligned polymerizable liquid crystal compound.

7. The display device according to claim 6, wherein the third region includes a non-aligned liquid crystal compound.

8. The display device according to claim 1, wherein the light transmittance control region is placed on the boundary between the regions for forming signals for the right and left eyes, when the device is observed from front, to overlap a part of the region for forming a signal for the right or left eye.

9. The display device according to claim 1, wherein relative brightness observed from front is 60% or more
    wherein the relative brightness is a ratio ($I_T/I_O$) of brightness ($I_T$) in a display device having the third region and the light transmittance control region, to brightness ($I_O$) in a display device without the third region and the light transmittance control region.

* * * * *